US011250074B2

(12) United States Patent
De Barros et al.

(10) Patent No.: US 11,250,074 B2
(45) Date of Patent: Feb. 15, 2022

(54) AUTO-GENERATION OF KEY-VALUE CLUSTERS TO CLASSIFY IMPLICIT APP QUERIES AND INCREASE COVERAGE FOR EXISTING CLASSIFIED QUERIES

(71) Applicant: Microsoft Technology Licensing, LLC, Redmond, WA (US)

(72) Inventors: Marcelo M. De Barros, Redmond, WA (US); Siddharth S. Shenoy, Sammamish, WA (US); Aman Singhal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 833 days.

(21) Appl. No.: 15/581,265

(22) Filed: Apr. 28, 2017

(65) Prior Publication Data

US 2018/0150556 A1    May 31, 2018

Related U.S. Application Data

(60) Provisional application No. 62/427,974, filed on Nov. 30, 2016.

(51) Int. Cl.
*G06F 16/00* (2019.01)
*G06F 16/951* (2019.01)
(Continued)

(52) U.S. Cl.
CPC ............ *G06F 16/951* (2019.01); *G06F 16/22* (2019.01); *G06F 16/285* (2019.01)

(58) Field of Classification Search
CPC ............ G06F 16/24578; G06F 16/951; G06F 16/248; G06F 16/285; G06F 16/2455;
(Continued)

(56) References Cited

U.S. PATENT DOCUMENTS 7,765,227 B1 *   7/2010   Khoshnevisan .... G06F 16/9535
                                                                707/769
7,836,108 B1    11/2010   Kupke et al.
(Continued)

FOREIGN PATENT DOCUMENTS

EP         1700235 A1    9/2006
WO      2015175384 A1   11/2015
(Continued)

OTHER PUBLICATIONS

Park, et al., "Mobile App Retrieval for Social Media Users via Inference of Implicit Intent in Social Media Text", In Proceedings of 25th ACM International Conference on Information and Knowledge Management, Oct. 24, 2016, 10 pgs.

*Primary Examiner* — Yicun Wu (57) ABSTRACT

A system and method of generating and using key-value clusters to classify and return app queries is provided. The system includes a computing device. The computing device includes: a processing device; and a computer readable data storage device storing instructions. When the instructions are executed by the processing device, the instructions are operative to provide: receiving a search query and retrieving a preliminary search result comprising at least n web results; and when the at least n web results matches the key cluster returning the key cluster and an associated value cluster as a result of the search.

20 Claims, 9 Drawing Sheets

(51) Int. Cl.
*G06F 16/22* (2019.01)
*G06F 16/28* (2019.01)

(58) Field of Classification Search
CPC .............. G06F 16/9535; G06F 16/22; G06F 16/24553; G06F 16/2465; G06F 16/4387; G06F 16/93; G06F 16/9024; G06F 16/3322; G06F 16/9537; G06F 17/2235; G06F 16/252; G06F 16/3344; G06F 16/35; G06F 16/353; G06F 16/903; G06F 16/90328; G06F 16/907; G06F 16/955
See application file for complete search history.

(56) References Cited

U.S. PATENT DOCUMENTS

| | | |
|---|---|---|
| 8,762,360 B2 | 6/2014 | Jiang et al. |
| 9,418,103 B2 | 8/2016 | Shapira et al. |
| 9,430,553 B2 | 8/2016 | Shapira et al. |
| 9,449,106 B2 | 9/2016 | Reese et al. |
| 9,454,565 B1 | 9/2016 | Evans et al. |
| 9,619,526 B1* | 4/2017 | Hoover .............. G06F 16/24578 |
| 10,678,878 B2* | 6/2020 | Li ....................... G06F 16/951 |
| 2011/0047161 A1* | 2/2011 | Myaeng ............. G06F 16/3338 707/740 |
| 2013/0290319 A1 | 10/2013 | Glover et al. |
| 2014/0279993 A1 | 9/2014 | Bernhardt et al. |
| 2014/0379747 A1 | 12/2014 | Majumder et al. |
| 2016/0188719 A1* | 6/2016 | Glover .............. G06F 16/24578 707/706 |

FOREIGN PATENT DOCUMENTS

| | | |
|---|---|---|
| WO | 2016018716 A1 | 2/2016 |
| WO | 2016065043 A1 | 4/2016 |

\* cited by examiner

MOBILE COMPUTING DEVICE

AUTO-GENERATION OF KEY-VALUE CLUSTERS TO CLASSIFY IMPLICIT APP QUERIES AND INCREASE COVERAGE FOR EXISTING CLASSIFIED QUERIES

RELATED APPLICATION

This application claims the benefit of U.S. Provisional Application No. 62/427,974 filed Nov. 30, 2016, the complete disclosure of which is hereby incorporated by reference in its entirety.

BACKGROUND

Returning good results to search queries is a constant challenge. For example, queries for applications ("apps") are often difficult to fulfill. Queries for applications can be implicit queries, where the word "app" does not appear in the query, or explicit queries, where the word app appears as one of the query terms. Results for implicit and explicit queries for apps should ideally return the same result, but they rarely do. Regardless of whether a query is implicit or explicit, current search technology does not provide comprehensive results.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage media for auto-generation of key-value clusters to classify web results and increase coverage for existing classified queries. A method of improving search query returns includes receiving a search query and retrieving a preliminary search result. If the preliminary search result contains greater than or equal to n web results, the method uses the associated n web results as a key cluster to retrieve an associated value cluster and returns the key cluster and the associated value cluster as a result of the search.

Further aspects are directed to a system including a computing device. The computing device includes: a processing device; and a computer readable data storage device storing instructions. When the instructions are executed by the processing device, the instructions are operative to provide: receiving a search query and retrieving a preliminary search result comprising at least n web results; and when the at least n web results matches the key cluster returning the key cluster and an associated value cluster as a result of the search.

Further aspects are direct to one or more computer storage media storing computer executable instructions, which, when executed by the computer, cause the computer to perform a method. The method includes receiving a search request; retrieving preliminary search results from the search request, where the search results contain n web results in a key cluster; and returning the web results in the key cluster and the web results in an associated value cluster to the user as the final search results.

Examples are implemented as a method, computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for automatically generating and using key-value clusters in a search environment. Key-value clusters are explained in detail with respect to FIG. 2 below, but simply put key clusters are clusters of n web results out of a total number of web results, x, in a category that are associated with respective value clusters of x-n web results. Throughout this description, an exemplary system and method will be described where the web results are apps or are associated with apps. So if a category has ten apps in the category and n was equal to two, then a key cluster would be a set of two apps associated with the eight remaining apps in the category, where the eight remaining apps are the key cluster's associated value cluster. For a given category of apps, for example, news, the key-value cluster system disclosed would generate all the combinations of n apps and associate each combination of n apps with the remaining x-n apps.

For example, if a category consisted of apps app1, app2, app3, app4, and app5, and n were set equal to 2, the following key clusters would be generated: app1/app2; app1/app3; app1/app4; app1/app5; app2/app3; app2/app4; app2/app 5; app3/app4; app3/app 5; and app4/app5. Each of those key values would be associated with the respective remaining apps in the category. So, for example, the key cluster app1/app2 would be associated with the value cluster app3/app4/app5. The key cluster app1/app3 would be associated with the value cluster app2/app4/app5. When an initial search result would return a key cluster, such as app1/app2, the returned search results not only return the key cluster that was found, but also would return the associated value cluster which in this case would be app3/app4/app5. In this way, more complete search results are returned for searches.

Figure 1:
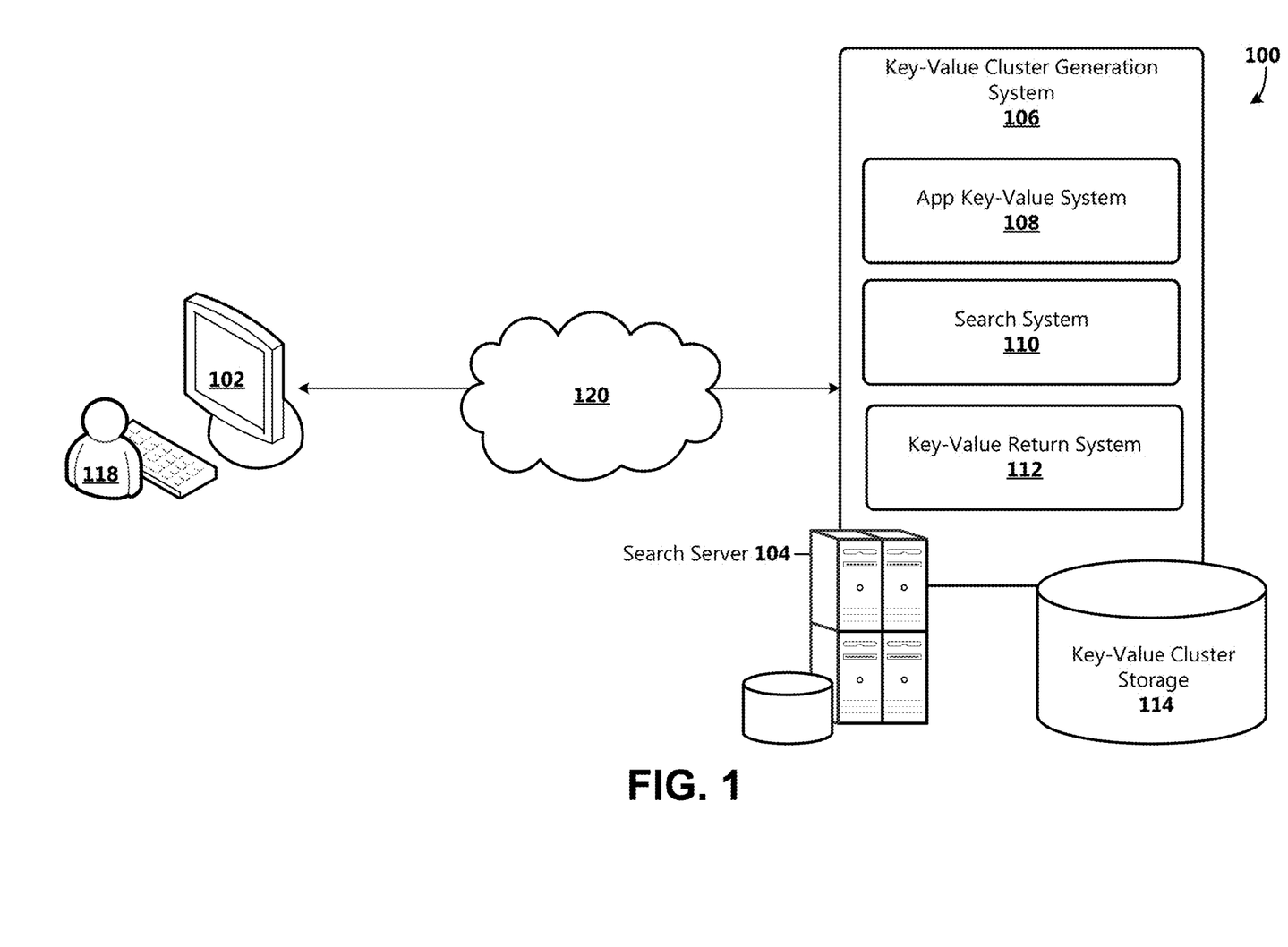
FIG. 1 is a block diagram of an example operating environment comprising a key-value cluster generation system.

With reference now to FIG. 1, an example operating environment 100 including a key-value cluster generation system 106 is shown. The example operating environment 100 includes a client computing device 102 via which user 118 (e.g., users wishing to perform searches) can use to perform searches. The client computing device 102 can be a variety of machines, including machines running the Windows operating system, MacOS operating system, Unix operating system, iOS operating system, Android operating system, Linux operating system, or represent a computing device in the cloud. The client computing device 102 is operative to communicate over a network 120, which may include wired or wireless networking, with a search server 104. For example, the search server 104 is illustrative of one or more computing devices operative to perform search services, including generation and use of key-value clusters. The hardware of these computing devices (including client device 102 and search server 104) is discussed in greater detail in regard to FIGS. 6, 7A, 7B, and 8.

The key-value cluster generation system 106 is executed on or communicatively connected to the search server 104. According to an aspect, the key-value cluster generation system 106 comprises an app key value system 108, a search system 110, a key-value return system 112, and a key-value cluster storage 114. As described further below, the app key-value cluster generation system 108 generates key-value clusters for apps within a variety of app categories, such as news, weather, and sports. Those key-value clusters are stored in key-value cluster storage 114. The search system 110 performs web searches and returns results of those searches. The key-value return system 112 uses the results from the search system 110 to see if two or more apps are returned, and if so, uses the returned apps as a key cluster to look up and return its associated value cluster.

Figure 2:
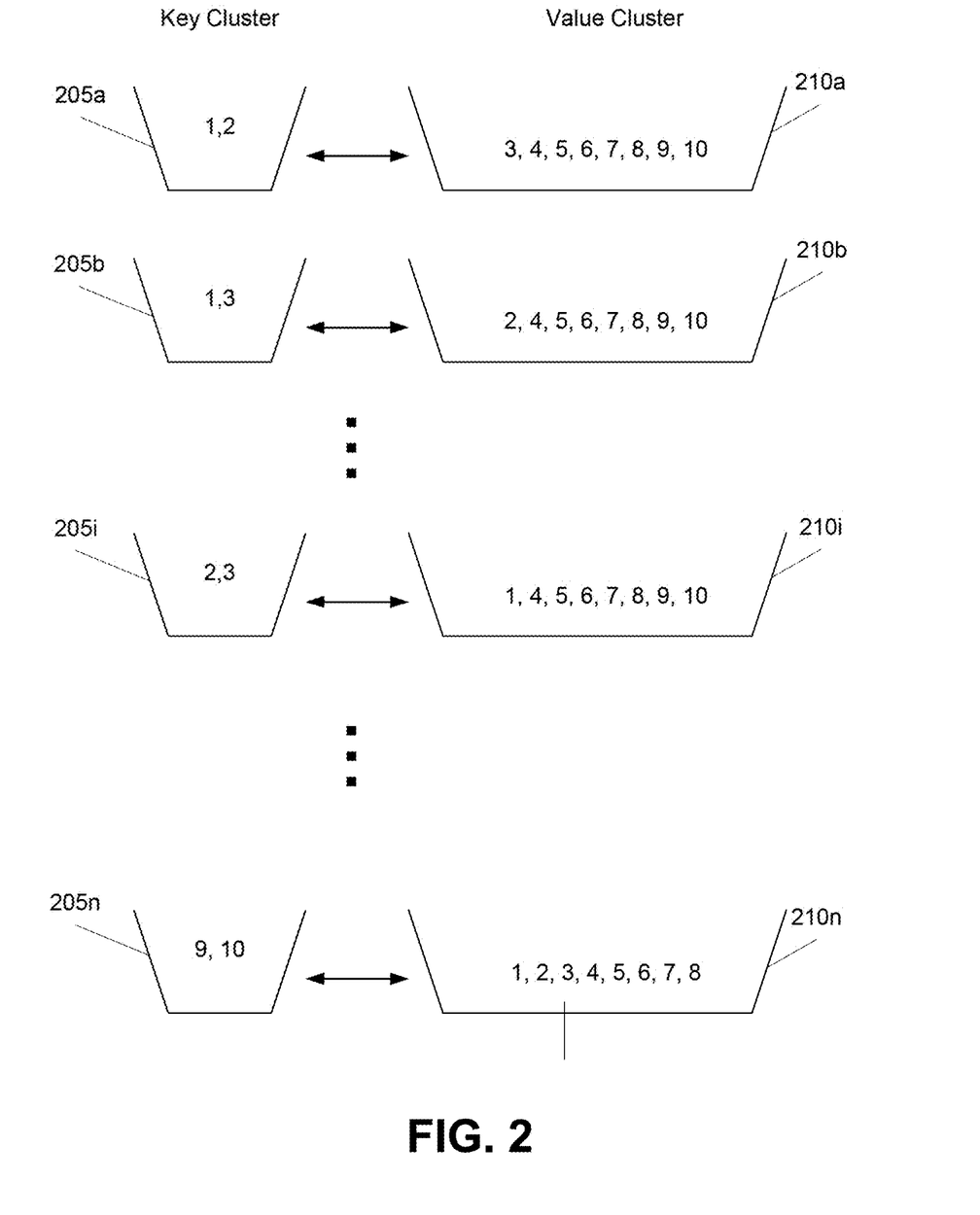
FIG. 2 is an illustration of a set of key clusters and associated key values.

FIG. 2 is an illustration of a set of key clusters and associated value clusters. Apps within a single category, such as news, are used to generate a set of key clusters and associated value clusters. For a category with x apps, every combination of n apps, where n is greater than or equal to two, is created as a key cluster and associated with a value cluster of x-n apps. For example, if n=2 and x=10, i.e., two key values are selected from a category containing ten applications, there will be $$C(x, n) = \frac{x!}{(x-n)!n!}$$

different combinations or 45 different combinations. Therefore, there will by 45 key clusters associated with respective 45 value clusters.

These are illustrated in FIG. 2 for an example with two keys in a key cluster and ten total apps in the category. Categories may be assigned by an app store or may be assigned by the key-value cluster generation system 106. For brevity, only certain key clusters and value clusters are illustrated in FIG. 2. A first key cluster 205a contains the values app1 and app2. First key cluster 205a is associated with value cluster 210a which contains the values app3, app4, app5, app6, app7, app8, app9, and app10. A second key cluster 205b contains the values app1 and app3. Second key cluster 205b is associated with value cluster 210b which contains the values app2, app4, app5, app6, app7, app8, app9, and app10. A tenth key cluster 205c contains the values app2 and app3. Tenth key cluster 205i is associated with value cluster 210i which contains the values app1, app4, app5, app6, app7, app8, app9, and app10. Finally, forty-fifth key cluster 205n contains the values app9 and app10. Forth-fifth key cluster 205n is associated with value cluster 210n which contains the values app1, app2, app3, app4, app5, app6, app7, and app8.

These key-value clusters are used to return better search results. Generally, each app in an app store has an associated app id and an associated web site that is assigned by the app store. When search engines return a web site with an associated app id, they typically return not only the web site, but also the associated app. By using key-value clusters, a search engine can take a small number of returned web results and associated apps, and instead of only returning the small number of associated apps return a larger number of apps.

Returning to our example having ten apps in a category, if a search engine were to return app1 and app2, those could be used as a key cluster to also return its associated value cluster of eight other apps in the app category. Thus, a two app return is converted to a ten app return. Where a large number of apps to be returned, each combination of n apps, where n can be any number greater than or equal to two, may be used as key clusters to return respective associated value clusters.

Figure 3:
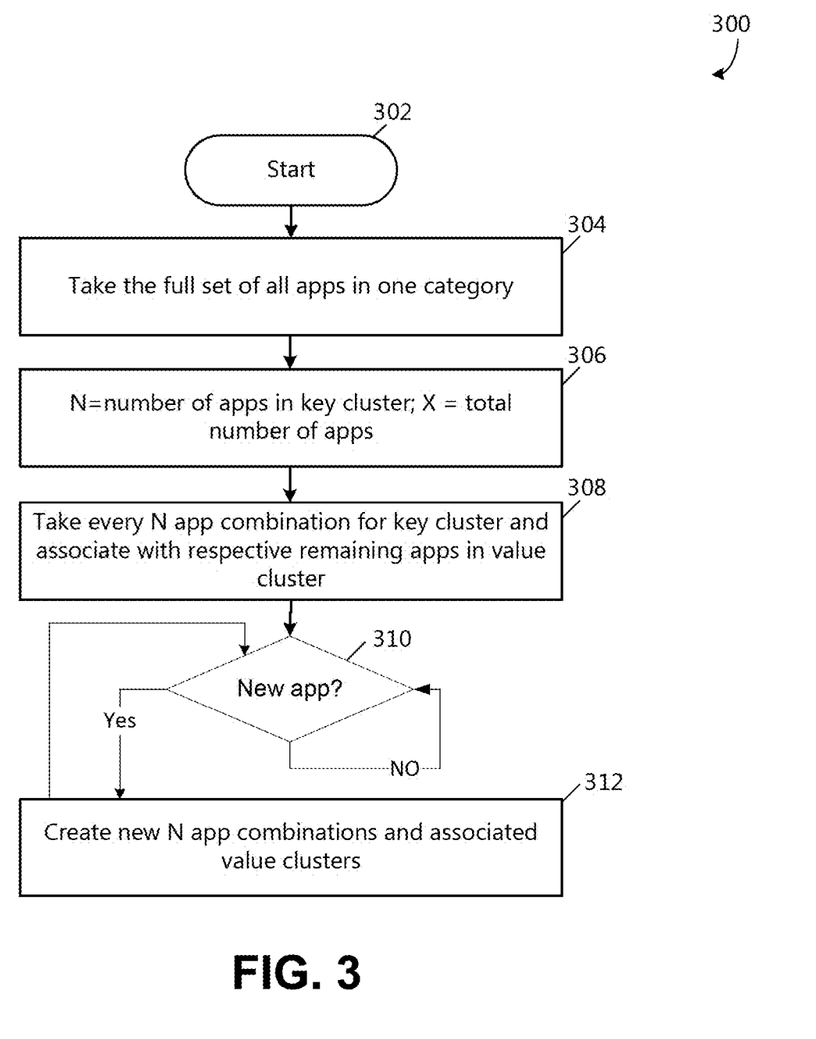
FIG. 3 is a flow chart showing general stages involved in an example method for generating key-value clusters.

FIG. 3 is a flow chart showing general stages involved in an example method for generating key-value clusters, where a key-value cluster is a key cluster and its associated value cluster. Method 300 starts at OPERATION 302 and continues to OPERATION 304 where the full set of apps for a single category is compiled into a list. Categories are generally assigned by an app store, but may also be assigned by the key-value cluster generation system 106. At OPERATION 306, N is set to the number of apps desired in a key cluster, and X is set to the total number of apps in the category. N is set by an administrator of the key-value cluster generation system 106, and X is based on the total results of a search for apps in the category. At OPERATION 308, every combination of N apps is created and associated with its respective value cluster, which include the remaining apps in the category set. An example of this was given above with respect to FIG. 2. Once the initial creation of key-value clusters are created, method 300 proceeds to OPERATION 310 where the method waits for a new app to appear in the category. When a new app appears in the category, all of the already established key-value clusters are updated with the inclusion of the new app, and new key-value clusters are created for the new app at OPERATION 312.

For example, if app11 were to appear when there were previously only ten apps in the category, then the previous 45 key-value clusters are added to include app11 in the value clusters for each of the 45. In addition, new key-value clusters are created for pairs 1, 11; 2, 11; 3, 11; 4, 11; 5, 11; 6, 11; 7, 11; 8, 11; 9, 11; and 10, 11.

Next, the method 300 returns to OPERATION 310 to determine, e.g., periodically, whether a new app has been added to a category. Furthermore, this method is implemented for each category in a particular collection of apps.

Figure 4:
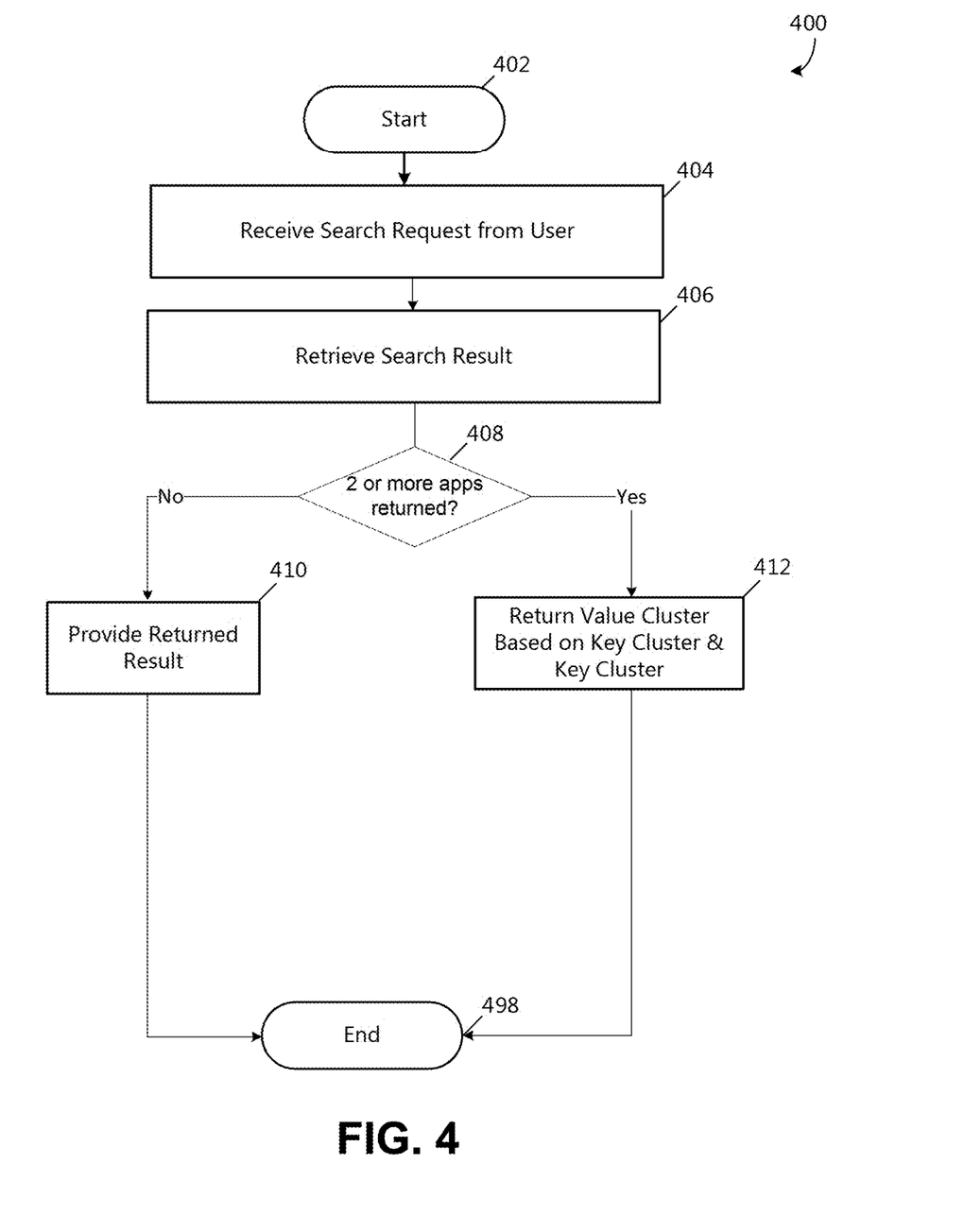
FIG. 4 is a flow chart showing general stages involved in an example method for returning search results using key-value clusters.

FIG. 4 is a flow chart showing general stages involved in an example method for returning search results using key-value clusters. This example assumes that the key cluster is of size two, but any size of two or more could be employed. Method 400 starts at OPERATION 402 and proceeds to OPERATION 404 where a search request is received from a client device. At OPERATION 406, initial search results are retrieved from the search engine. At OPERATION 408, if two or more web results associated with an app are returned, then the associated apps are used as the key cluster to return both those two or more apps, as well as the associated value cluster. Where multiple web results are returned, then each combination of two or more apps may be used as key clusters and multiple respective value clusters are returned. For example, if results w, x, y, and z are returned, then the key clusters of wx, wy, wz, xy, xz, and yz may all be used as key clusters to return their associated value clusters.

Thus, a wider number of apps in the category may be returned to a client device at OPERATION 412 as compared to the number of apps that would have been returned absent the use of this system. When the results are returned, they may be returned in order with the key clusters being returned first and the value clusters being returned last.

If at least two apps are not returned, then the initial search results are provided to the client device at OPERATION 410. At OPERATION 498, the method 400 ends.

Figure 5:
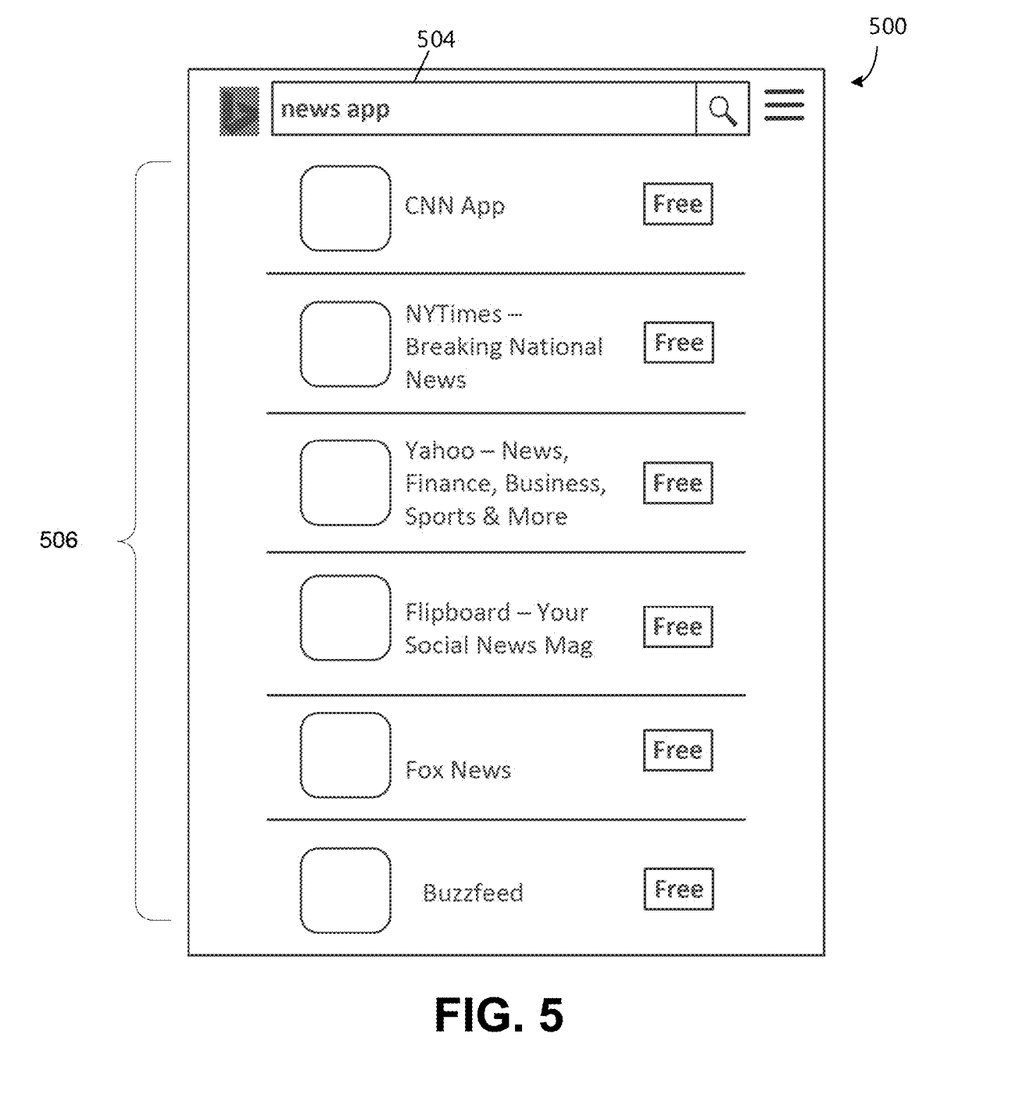
FIG. 5 is an illustration of an exemplary search result screen that uses key-value clusters.

FIG. 5 is an illustration of an exemplary search result screen that uses key-value clusters. Exemplary search result screen 500 shows a search in a search box 504 for "news app." Even though "news app" is shown in the search box, a search for "news" would return the same app results 506. The app results 506 are returned by the key-value search system. These search results are relatively complete because the key-value cluster system implemented in this disclosure returns a relatively complete list of news apps. For example, if the search result would initially return only "CNN App" and "NYTimes", the key-value cluster system would have associated the key cluster "CNN App" and "NYTimes" with the value cluster "Yahoo," "Flipboard," "Fox News," and "Buzzfeed." So, the search returned to the user is not the more limited result of "CNN App" and "NYTimes," but also the other news apps in the associated value cluster. Absent the use of the key-value search system, the only results that would be returned would have been "CNN App" and "NYTimes." Thus, the key-value system provides for a more complete list of returned web results, or apps, than would have been returned without the system.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
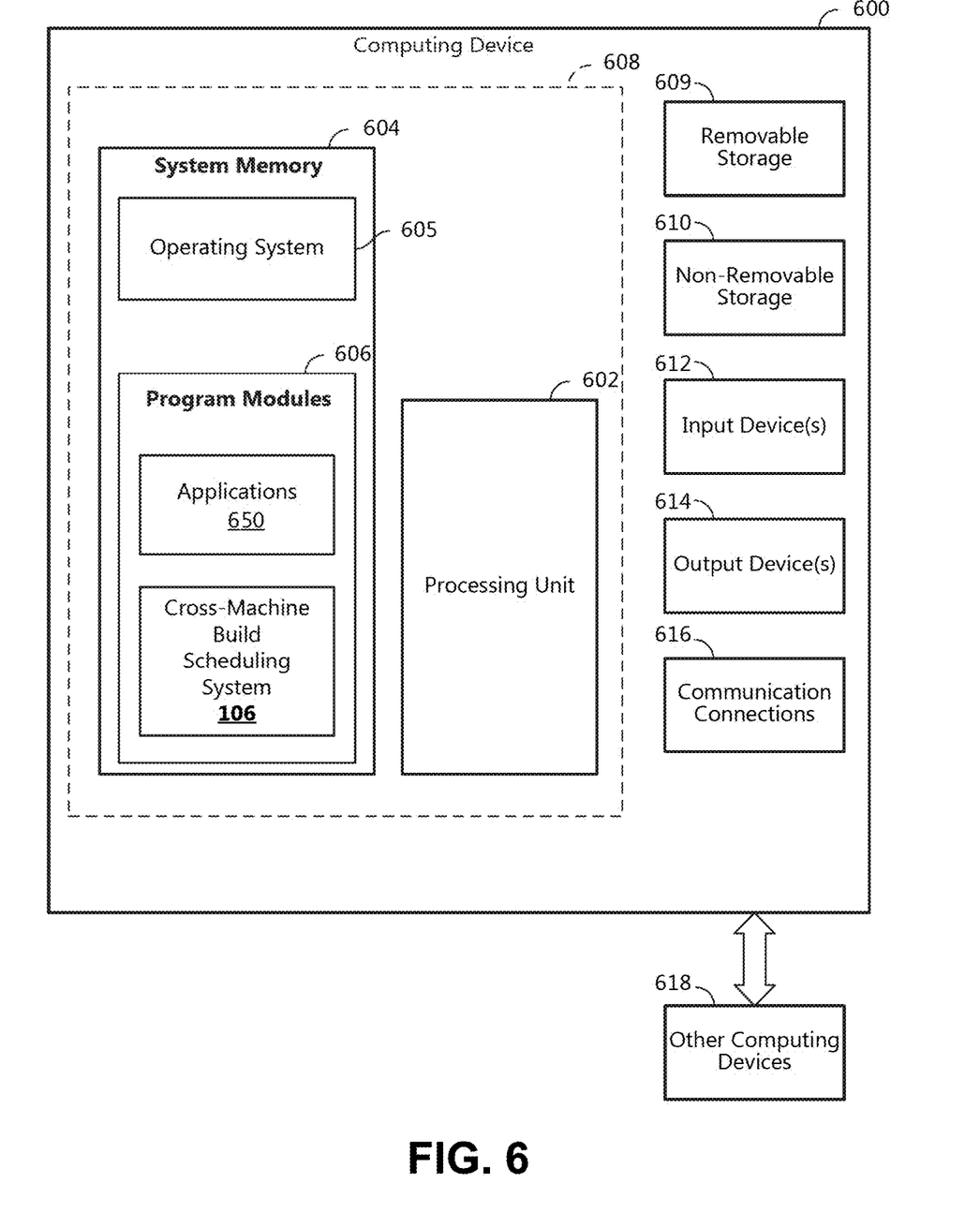
FIG. 6 is a block diagram illustrating example physical components of a computing device.
Figure 7A:
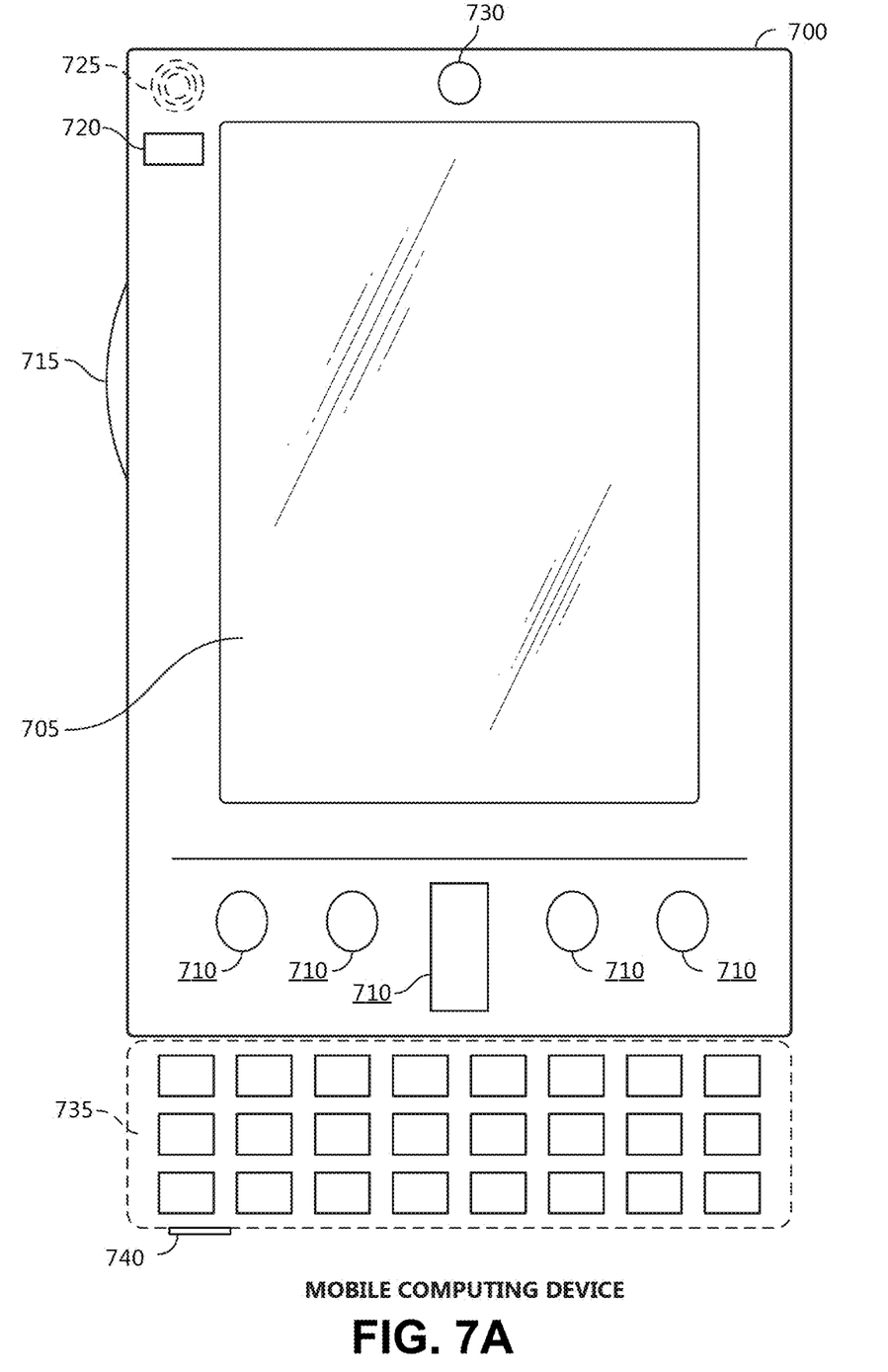
FIGS. 7A and 7B are simplified block diagrams of a mobile computing device.
Figure 7B:
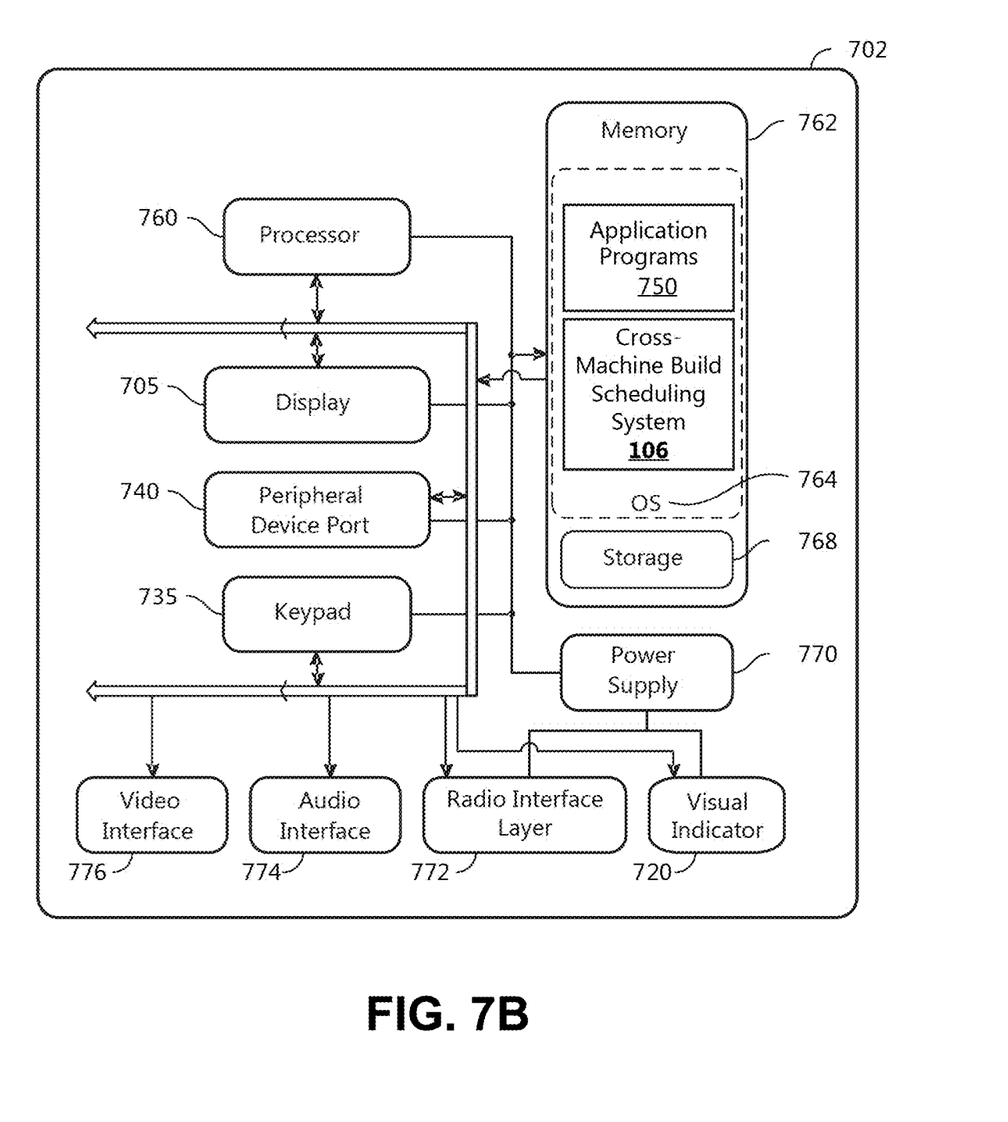
Figure 8:
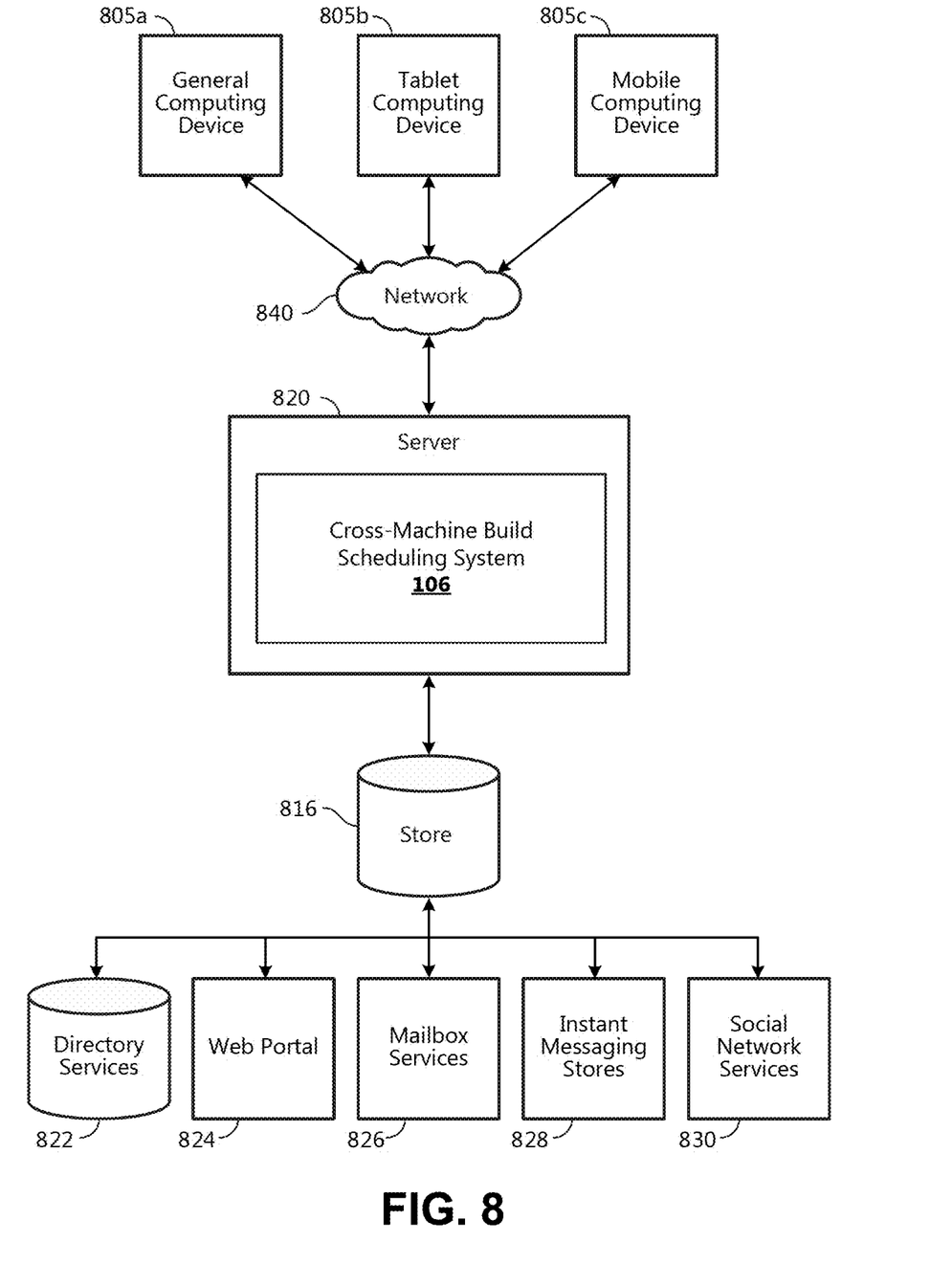
FIG. 8 is a simplified block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes the key-value cluster generation system 106. The operating system 605, for example, is suitable for controlling the operation of the computing device 600. Furthermore, aspects are practiced in conjunction with a graphics library, other operating systems, or any other application program, and is not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., key-value cluster generation system 106) perform processes including, but not limited to, one or more of the stages of the methods 400, 500, 600, 700 illustrated in FIGS. 4, 5, 6, and 7. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage). According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or less input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the key-value cluster generation system 106 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 is stored locally on the mobile computing device 700, as described above. According to another aspect, the data is stored on any number of storage media that is accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

FIG. 8 illustrates one example of the architecture of a system for using a key-value cluster system as described above. Content developed, interacted with, or edited in association with the key-value cluster generation system 106 is enabled to be stored in different communication channels or other storage types. For example, various documents may be stored using a directory service 822, a web portal 824, a mailbox service 826, an instant messaging store 828, or a social networking site 830. The key-value cluster generation system 106 is operative to use any of these types of systems or the like for automatically managing and validating a codebase, as described herein. According to an aspect, a server 820 provides the key-value cluster generation system 106 to clients 805a,b,c. As one example, the server 820 is a web server providing the key-value cluster generation system 106 over the web. The server 820 provides the key-value cluster generation system 106 over the web to clients 805 through a network 840. By way of example, the client computing device is implemented and embodied in a personal computer 805a, a tablet computing device 805b or a mobile computing device 805c (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method of improving search query results, comprising:
   receiving a preliminary search result in response to a search query, the preliminary search result comprising three or more web results;
   using a subset of the three or more web results as a key cluster, where each web result in the key cluster is associated with a common category;
   based on the common category of the key cluster, retrieving an associated value cluster that contains at least one web site that is not included in the preliminary search result but is associated with the common category of the key cluster; and
   returning results from both the key cluster and the associated value cluster as a final search result.

2. The method of claim 1, further comprising monitoring the web for the presence of a new web result appearing in the common category.

3. The method of claim 2, further comprising when a new web result appears in the common category, creating a new key cluster comprising the new web result and at least one web result selected from the preliminary search result.

4. The method of claim 3, further comprising creating a new associated value cluster based on the new web result.

5. The method of claim 4, further comprising associating the new key cluster with the new associated value cluster.

6. The method of claim 5, further comprising when the preliminary search result matches the new key cluster, returning as the final search result the new key cluster and the new value cluster.

7. The method of claim 1 wherein the key value cluster comprises two web results.

8. The method of claim 1 wherein the common category comprises a subject matter of an application.

9. The method of claim 1 wherein the search query is implicit.

10. The method of claim 1 wherein the three or more web results comprise applications.

11. A system comprising:
   a processing device; and
   a computer readable data storage device storing instructions that, when executed by the processing device are operative to:
      receive a preliminary search result in response to a search query, the preliminary search result comprising three or more web results;
      use a subset of the three or more web results as a key cluster, where each web result in the subset is associated with a common category;
      based on the common category, retrieve an associated value cluster that contains at least one web result that is not included in the preliminary search result but is associated with the common category; and
      return results from both the key cluster and an associated value cluster as a final search result.

12. The system of claim 11, further comprising:
   creating the key cluster comprising n web results out of x total web results in the common category;
   pairing the key cluster with the associated value cluster comprising the remaining x-n web results; and
   storing the key cluster and associated value cluster.

13. The system of claim 11, further comprising monitoring the web for the presence of a new web result appearing in the common category.

14. The system of claim 13, further comprising when a new web result appears in the category, creating a new key cluster comprising the new web result and at least one web result selected from the x previous web results.

15. The system of claim 14, further comprising creating a new associated value cluster comprising x+1-n web results, where the x+1-n web results do not include the new web result and the at least one web result selected from the x previous web results.

16. The system of claim 15, further comprising associating the new key cluster with the new associated value cluster.

17. The system of claim 16, further comprising when the preliminary search result matches the new key cluster, returning as the final search result the new key cluster and the new value cluster.

18. One or more computer storage media storing computer executable instructions, which, when executed by the computer, cause the computer to perform a method, the method comprising:
   receiving a preliminary search result from a search query, the preliminary search result comprising three or more web results;
   using a subset of the three or more web results as a key cluster, where each web result in the subset is associated with a common category;
   based on the common category, retrieving an associated value cluster that contains at least one web result that is not included in the preliminary search result but is associated with the common category; and
   returning results from both the key cluster and the associated value cluster as a final search result.

19. The computer storage media of claim 18, further comprising monitoring the web for the presence of a new web result appearing in the common category.

20. The computer storage media of claim 19, further comprising when a new web result appears in the common category, creating a new key cluster comprising the new web result and at least one web result selected from the preliminary search result.

* * * * *